(12) United States Patent  
Pinkerton et al.

(10) Patent No.: US 7,765,405 B2
(45) Date of Patent: Jul. 27, 2010

(54) RECEIVE SIDE SCALING WITH CRYPTOGRAPHICALLY SECURE HASHING

(75) Inventors: James T. Pinkerton, Sammamish, WA (US); Sanjay N. Kaniyar, Redmond, WA (US); Bhupinder S. Sethi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1254 days.

(21) Appl. No.: 11/064,941

(22) Filed: Feb. 25, 2005

(65) Prior Publication Data

US 2006/0195698 A1 Aug. 31, 2006

(51) Int. Cl.
*H04L 9/32* (2006.01)
(52) U.S. Cl. ............... 713/181; 711/216; 370/393; 713/189; 713/151
(58) Field of Classification Search ........ 713/151, 713/181, 189; 711/216; 370/393
See application file for complete search history.

(56) References Cited

U.S. PATENT DOCUMENTS

| | | | | |
|---|---|---|---|---|
| 5,608,870 A * | 3/1997 | Valiant | ............... | 711/100 |
| 5,655,103 A | 8/1997 | Cheng et al. | | |
| 5,872,972 A | 2/1999 | Boland et al. | | |
| 5,892,829 A * | 4/1999 | Aiello et al. | ............... | 713/180 |
| 5,914,938 A * | 6/1999 | Brady et al. | ............... | 370/254 |
| 5,966,543 A | 10/1999 | Hartner et al. | | |
| 6,038,651 A | 3/2000 | VanHuben et al. | | |
| 6,052,733 A | 4/2000 | Mahalingam et al. | | |
| 6,179,489 B1 | 1/2001 | So et al. | | |
| 6,230,151 B1 | 5/2001 | Agrawal et al. | | |
| 6,249,845 B1 | 6/2001 | Nunez et al. | | |
| 6,314,501 B1 | 11/2001 | Gulick et al. | | |
| 6,327,614 B1 * | 12/2001 | Asano et al. | ............... | 709/213 |
| 6,356,951 B1 | 3/2002 | Gentry, Jr. | | |
| 6,389,468 B1 * | 5/2002 | Muller et al. | ............... | 709/226 |
| 6,470,389 B1 | 10/2002 | Chung et al. | | |
| 6,470,442 B1 * | 10/2002 | Arimilli et al. | ............... | 712/32 |
| 6,480,876 B2 | 11/2002 | Rehg et al. | | |
| 6,502,141 B1 | 12/2002 | Rawson, III | | |
| 6,516,429 B1 | 2/2003 | Bossen et al. | | |
| 6,567,806 B1 * | 5/2003 | Tsuchida et al. | ............... | 707/7 |
| 6,578,131 B1 * | 6/2003 | Larson et al. | ............... | 711/216 |
| 6,618,386 B1 | 9/2003 | Liu et al. | | |
| 6,643,636 B1 | 11/2003 | Au et al. | | |
| 6,754,222 B1 * | 6/2004 | Joung et al. | ............... | 370/412 |
| 6,763,519 B1 | 7/2004 | McColl et al. | | |
| 6,772,333 B1 | 8/2004 | Brendel | | |
| 6,823,471 B1 * | 11/2004 | Arimilli et al. | ............... | 714/10 |
| 6,888,797 B1 * | 5/2005 | Cao et al. | ............... | 370/235 |
| 6,981,074 B2 * | 12/2005 | Oner et al. | ............... | 710/32 |
| 6,981,110 B1 * | 12/2005 | Melvin | ............... | 711/154 |

(Continued)

*Primary Examiner*—David García Cervetti
(74) *Attorney, Agent, or Firm*—Wolf, Greenfield & Sacks, P.C.

(57) ABSTRACT

A new method and framework for scheduling receive-side processing of data streams received from a remote requesting client by a multiprocessor system computer is disclosed. The method receives data packets from the remote requesting client via a network and, for each data packet, applies a cryptographically secure hashing function to portions of the received data packet yielding a hash value. The method further applies the hash value to a processor selection policy to identify a processor in the multiprocessor system as a selected processor to perform receive-side processing of the data packet. The method queues the received data packet for processing by the selected processor and invokes a procedure call to initiate processing of the data packet.

14 Claims, 11 Drawing Sheets

U.S. PATENT DOCUMENTS

| | | | |
|---|---|---|---|
| 7,003,574 B1 | 2/2006 | Bahl | |
| 7,203,747 B2 * | 4/2007 | Bhat et al. | 709/224 |
| 7,219,121 B2 * | 5/2007 | Kaniyar et al. | 709/201 |
| 7,225,219 B2 * | 5/2007 | Giacomini et al. | 709/200 |
| 7,366,092 B2 * | 4/2008 | Moll et al. | 370/218 |
| 2002/0054567 A1 | 5/2002 | Fan | |
| 2002/0091748 A1 | 7/2002 | Rehg et al. | |
| 2002/0110134 A1 * | 8/2002 | Gracon et al. | 370/412 |
| 2002/0112076 A1 | 8/2002 | Rueda et al. | |
| 2002/0124104 A1 | 9/2002 | Rappaport et al. | |
| 2003/0009559 A1 * | 1/2003 | Ikeda | 709/225 |
| 2003/0037093 A1 * | 2/2003 | Bhat et al. | 709/105 |
| 2003/0058862 A1 * | 3/2003 | Lansing et al. | 370/392 |
| 2003/0061495 A1 * | 3/2003 | Minnick | 713/189 |
| 2003/0063611 A1 | 4/2003 | Schaub et al. | |
| 2003/0067930 A1 | 4/2003 | Salapura et al. | |
| 2003/0137978 A1 | 7/2003 | Kanetake | |
| 2003/0167346 A1 | 9/2003 | Craft et al. | |
| 2003/0187914 A1 * | 10/2003 | Kaniyar et al. | 709/201 |
| 2003/0195919 A1 * | 10/2003 | Watanuki et al. | 709/105 |
| 2004/0010545 A1 * | 1/2004 | Pandya | 709/203 |
| 2004/0030770 A1 * | 2/2004 | Pandya | 709/223 |
| 2004/0037319 A1 * | 2/2004 | Pandya | 370/469 |
| 2005/0027793 A1 * | 2/2005 | Hass | 709/200 |
| 2005/0071843 A1 | 3/2005 | Guo et al. | |
| 2005/0078601 A1 * | 4/2005 | Moll et al. | 370/218 |
| 2005/0078669 A1 * | 4/2005 | Oner | 370/389 |
| 2005/0078696 A1 * | 4/2005 | Oner | 370/419 |
| 2005/0080952 A1 * | 4/2005 | Oner et al. | 710/52 |
| 2006/0072563 A1 * | 4/2006 | Regnier et al. | 370/389 |
| 2007/0214266 A1 * | 9/2007 | Boman et al. | 709/226 |
| 2008/0198867 A1 * | 8/2008 | Moll et al. | 370/419 |

* cited by examiner

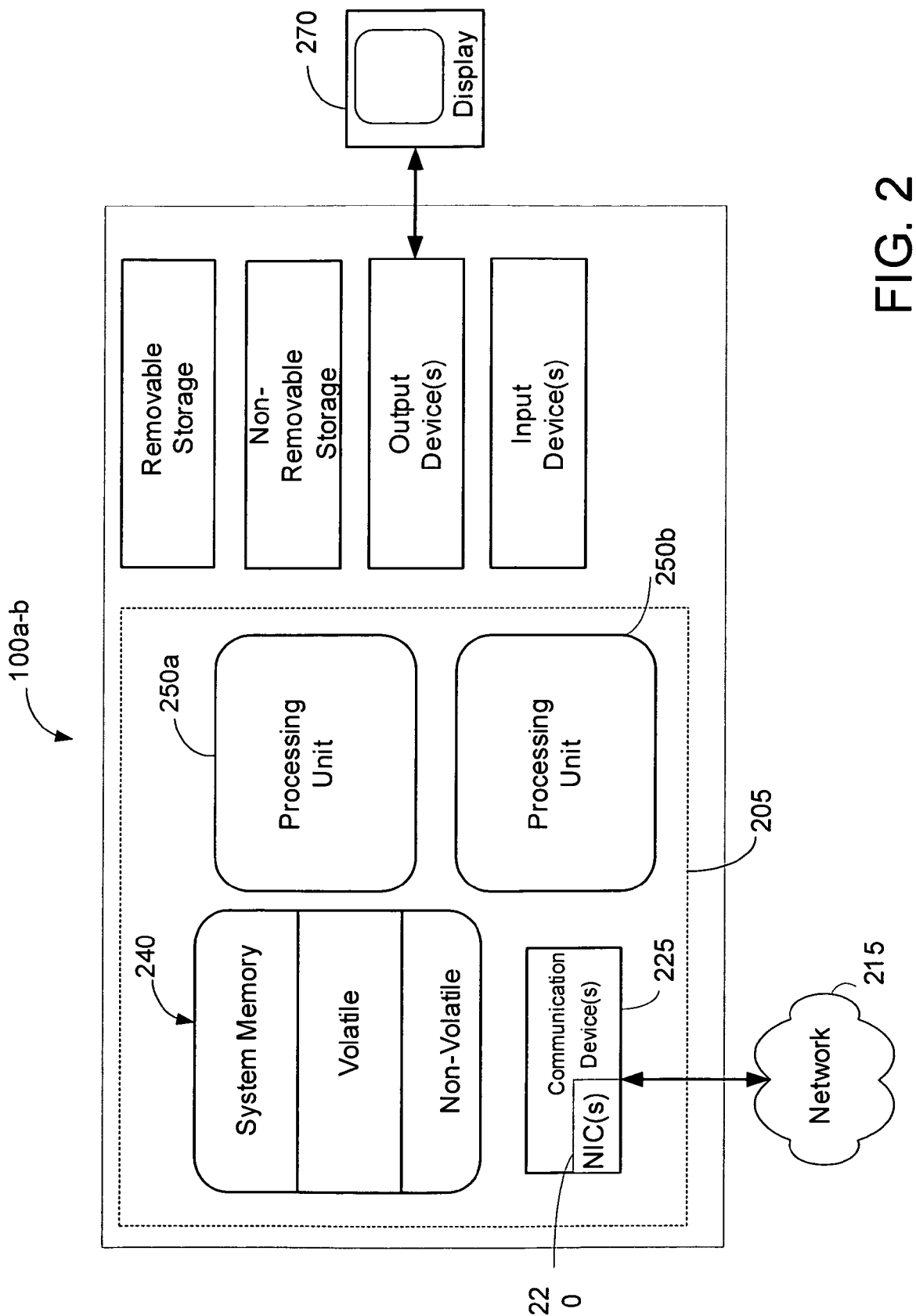

RECEIVE SIDE SCALING WITH CRYPTOGRAPHICALLY SECURE HASHING

FIELD OF THE INVENTION

The present invention generally relates to the area of computer networks and implementation of symmetrical multiprocessing in multiprocessor systems. More particularly, the present invention is directed to a secure hash mechanism for systematically and securely partitioning I/O tasks for network connections across processors in a multiprocessor system.

BACKGROUND OF THE INVENTION

Today's traditional computer architectures enlist computer systems with multiple processors to perform receive-side processing of requests received across a network from remote clients. The requests are in the form of I/O tasks that are partitioned across multiple processors working in concert to execute the I/O tasks. Allowing multiple processors to simultaneously perform incoming I/O tasks provides an overall faster performance time for the computer system. One of the more challenging aspects of utilizing multiple processors is "scalability," that is, partitioning the I/O tasks for connections across processors in a way that optimizes each processor individually and collectively.

A well-known computer hardware system for achieving scalability is a "symmetric multiprocessor" (SMP) system. An SMP system uses two or more identical processors that appear to the executing software to be a single processing unit. In an exemplary SMP system, multiple processors in one system share a global memory and I/O subsystem including a network interface card commonly referred to as a "NIC." As is known in the art, the NIC enables communication between a host computer and remote computers located on a network such as the Internet. NICs communicate with remote computers through the use of a network communications protocol, for example, TCP ("Transmission Control Protocol"). TCP, like other protocols, allows two computers to establish a connection and exchange streams of data. In particular, TCP guarantees lossless delivery of data packets sent by the remote computer to the host computer (and vice-versa).

After a network connection is established between a host computer and a remote computer, the remote computer sends a data stream to the host computer. The data stream itself may comprise multiple data packets and ultimately entail sending more than one data packet from the remote computer to the host computer. When the NIC on the host computer receives a first data packet, the first data packet is stored in memory along with a packet descriptor that includes pointer information identifying the location of the data in memory. Thereafter, an interrupt is issued to one of the processors in the SMP system. As the interrupt service routine (ISR) runs, all further interrupts from the NIC are disabled and a deferred procedure call (DPC) is requested to run on the selected processor. Meanwhile, as more data packets are received by the NIC, the data packets are also stored in memory along with packet descriptors. No interrupts are generated, however, until the DPC for the first interrupt runs to completion.

As the DPC runs, the data packet descriptors and associated data packets are pulled from memory to build an array of received packets. Next, protocol receive-processing is invoked indirectly via calls to a device driver interface within the DPC routine. An exemplary interface is the Network Driver Interface Specification (NDIS), a Microsoft Windows device driver interface that enables a single NIC to support multiple network protocols. After the DPC runs to completion, interrupts are re-enabled and the NIC generates an interrupt to one of the processors in the multiprocessor system. Because only one DPC runs for any given NIC at any given time, when the scheduling processor is running a receive DPC other processors in the system are not conducting receive processing. This serialization problem limits scalabilty in the SMP system and degrades performance of the multiprocessor system. An alternate method may combine the ISR and DPC into a single routine.

Similarly, because data packets relating to a particular network connection are often received by the NIC at different intervals, receive-side processing of data packets may occur on different processors under the above-described scheme. When a processor processes data packets belonging to a particular network connection, the state for that network connection is modified. If data packets associated with this network connection were previously processed by a first processor, the network connection state resides in the first processor's cache. In order for a second processor to process packets related to a request previously processed by the first processor, the state is pulled from the first processor's cache to main memory, and the first processor's cache is invalidated. This process of copying the state and invalidating the cache results in performance degradation of the multiprocessor system. Similarly, with the above scheme, send and receive processing for the same network connection can occur simultaneously on different processors leading to contention and spinning that also causes performance degradation.

U.S. Pat. No. 7,219,121 provides a method and framework for implementing symmetrical multiprocessing in a multiprocessor system and increasing performance of the multiprocessor system. That application describes a receive-side scheduling framework including a network interface card, memory and two or more processors, communicably coupled to each other to handle network connections and I/O tasks associated with the network connections. An example of such an I/O task is a data stream associated with the Transmission Control Protocol (also referred to as "TCP"). The data packets received by a NIC in the multiprocessor system are stored, along with a data packet descriptor, in memory. A scheduling processor in the multiprocessor system, selected by a load-balancing algorithm, reads each data packet and applies a mapping algorithm to portions of the data packet yielding a map value. The map value, in conjunction with a processor selection policy, determines which "selected processor" in the multiprocessor is scheduled to manage the data stream.

The mapping algorithm is any acceptable algorithm, such as a hashing function, adopted by the system that ensures data packets received from the same network connection are routinely scheduled for processing by the same selected processor in the multiprocessor system. The scheduling processor then processes the data requests assigned to the scheduling processor itself. Thereafter, each of the other selected processors is requested to execute the data requests scheduled to that selected processor.

Moreover, data packets received by the NIC from a network connection are individually hashed, with the use of a hashing function, by the NIC. The hashing function yields a hash value that identifies which processor is selected to process the data packet. The hashing function is chosen such that the load is distributed optimally across the processors. The hash value is then stored along with a data packet descriptor and the data packet in memory. A scheduling processor, selected by a load-balancing algorithm, then reads each data packet descriptor to ascertain the hashing value. With the use of a processor selection policy, each data packet is queued for processing by the selected processor.

While this hash function successfully distributes packets across multiple processors, it does not prevent malicious users from purposefully causing packets to be directed to the same processor. That is, if the hash function is known to a malicious user, that user can design packets that will repeatedly produce the same hash. By doing this, the malicious user can overflow the queue on a specific processor. The hash bucket for each processor has a corresponding linked list of received packets. More computational resources are consumed as the length of that list grows. Accordingly, there is a need for secure receive-side scaling for symmetrical multi-processing in a multiprocessor system.

BRIEF SUMMARY OF THE INVENTION

In view of the foregoing, the invention provides a method for scheduling receive-side processing of data packets in a multiprocessor computer system comprising a network interface communicably coupled to a network to receive data streams, memory and at least two local processors. The method comprises the steps of establishing a network connection between a remote requesting client and the multiprocessor computer system; receiving a data packet from the remote requesting client over the network connection; applying a cryptographically secure hashing function to the data packet, the cryptographically secure hashing function producing a hash value; applying the hash value to a processor selection policy to identify the local processor as a selected processor to perform receive-side processing of the data packet; directing the received data packet to the selected processor; and processing the data packet.

Another embodiment of the invention provides a method for packet context lookup in a multiprocessor computer system comprising a network interface communicably coupled to a network to receive data streams, memory and at least two local processors. The method includes receiving a data packet from a remote requesting client over the network connection; applying a cryptographically secure hashing function to the data packet, the cryptographically secure hashing function producing a hash value; and finding a packet context associated with the hash value by utilizing a packet context lookup table mapping a plurality of hash values to a plurality of packet contexts. This embodiment of the invention may further include establishing a TCP connection between the remote requesting client and the multiprocessor system, wherein the packet context is a TCP packet context. The packet context lookup table may be partitioned among the at least two local processors, and a first portion of the hash value is used to identify a partition corresponding to one of the at least two local processors, and a second portion of the hash value is to lookup the packet context within the identified partition.

In one embodiment, the receiving step comprises receiving, by the network interface, the data packet from the network and storing the data packet and a data packet descriptor in memory. Applying a cryptographically secure hashing function may comprise reading, by a scheduling processor, the data packet descriptor and the data packet from memory and applying a cryptographically secure hashing function to the data packet yielding the hash value. Applying the hash value to a processor selection policy may comprise utilizing, by the scheduling processor, a map table to resolve a processor number indicating the selected processor using the hash value.

In another embodiment of the invention, a processor offset is applied by incrementing the processor number by the processor offset. In yet another embodiment of the invention, the network connection is a TCP connection. Furthermore, a hash mask may be applied to the hash value before applying the hash value to a processor selection policy.

Still another embodiment of the invention provides a method for TCP context lookup in a multiprocessor computer system comprising a network interface communicably coupled to a network to receive data streams, memory and at least two local processors. The method includes establishing a TCP network connection between a remote requesting client and the multiprocessor computer system; receiving a data packet from the remote requesting client over the network connection; applying a cryptographically secure hashing function to the data packet, the cryptographically secure hashing function producing a hash value; and finding a TCP context associated with the hash value by utilizing a TCP context lookup table mapping a plurality of hash values to a plurality of TCP contexts.

Additional features and advantages of the invention are made apparent from the following detailed description of illustrative embodiments which proceeds with reference to the accompanying figures.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2 is a block diagram of a general purpose multiprocessor system in which aspects of the present invention and/or portions thereof may be incorporated;

While the invention will be described in connection with certain preferred embodiments, there is no intent to limit it to those embodiments. On the contrary, the intent is to cover all alternatives, modifications, and equivalents as included within the spirit and scope of the invention as defined by the appended claims.

DETAILED DESCRIPTION OF THE INVENTION

In some situations, it is beneficial if the same processor in a multiprocessor system performs receive-side processing of all I/O tasks relating to a particular connection. There is a need for a method and framework for systematically partitioning I/O tasks for connections across processors in a multiprocessor system such that the connection state lives on a single processor for the lifetime of a network connection.

Figure 1:
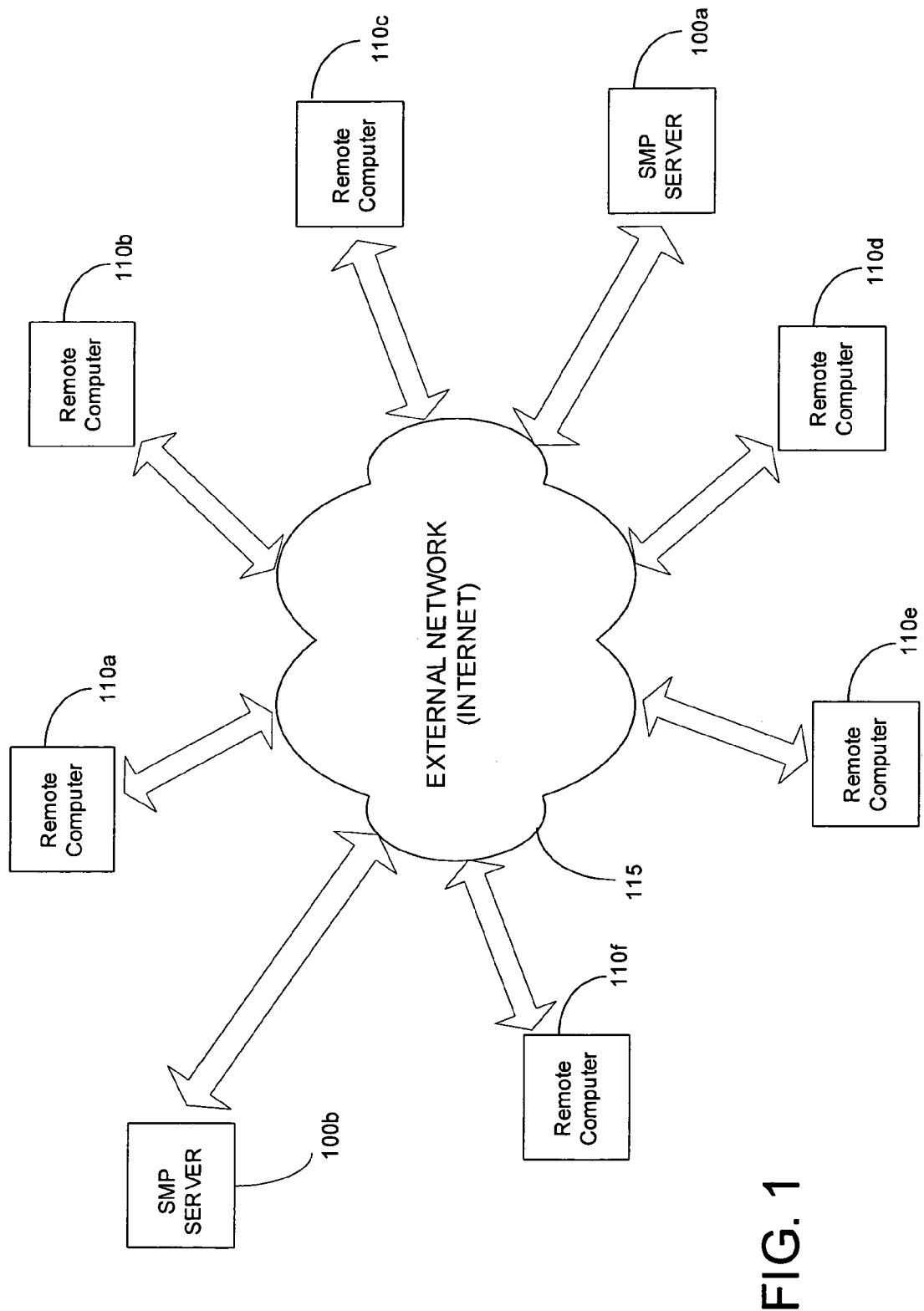
FIG. 1 is a schematic diagram of a networked computer system in which aspects of the present invention and/or portions thereof may be incorporated.

In an embodiment of the present invention, a receive-side processing technique comprises communication system software executed within an SMP system computer operating environment such as the one depicted in FIG. 1, and in particular one that is configured to support potentially hundreds of thousands of concurrent network connections and data streams. Such a computing environment is potentially present in popular website server configurations that exist today. FIG. 1 illustratively depicts an example of a suitable operating environment within which the invention is implemented. The example network includes several remote computers 110a-f communicating with multiprocessor systems 100a-b over a network 115, represented as a cloud. Network 115 includes any of many well-known components, such as routers, gateways, hubs, etc. and allows remote computers 110a-f to communicate via wired and/or wireless media.

The operating environment is only one example of a suitable operating environment and is not intended to suggest any limitation as to the scope of use or functionality of the invention. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention is described in the general context of computer-executable instructions, such as program modules, being executed by a system computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Referring to FIG. 2, an example of a basic configuration for multiprocessor systems 100a-b on which the invention described herein is implemented is shown. Multiprocessor systems 100a-b comprise any appropriate multiprocessor computer or server capable of achieving scalability beyond a single processor. A suitable hardware structure for achieving scalability beyond a single processor is a "symmetric multiprocessor" (SMP) system. In an SMP system, multiple processors in one computer share a global memory and I/O subsystem.

In its most basic configuration, SMP systems 100a-b include two or more processing units 250a-b, communication device(s) 225 and memory 240. Depending on the exact configuration and type of SMP system, the memory 240 may be volatile (such as RAM), non-volatile (such as ROM or flash memory) or some combination of the two. SMP systems 100a-b also contain communication device(s) 225 that allows the SMP systems 100a-b to communicate with other computers in the network. The communication device(s) include a network interface, such as a network interface card (NIC) 220, coupled to a network 215. Various and multiple NICs are employed in alternative embodiments of the invention including, but not limited to, cards that support Ethernet (802.3), Token Ring (802.5), ARCNET 878.2, Wireless and ATM. Communication device(s) and media typically embody computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media. This most basic configuration is illustrated in FIG. 2 by dashed line 205.

Additionally, the SMP systems 100a-b may also have additional features/functionality. For example, SMP systems 100a-b may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the SMP systems 100a-b. Any such computer storage media may be part of the SMP systems 100a-b. SMP systems 100a-b may also have input devices such as a keyboard, mouse, pen, voice input device, touch input device, etc. Output devices such as a display 270, speakers, a printer, etc. may also be included. All these devices are well known in the art and need not be discussed at length here.

Figure 3A:
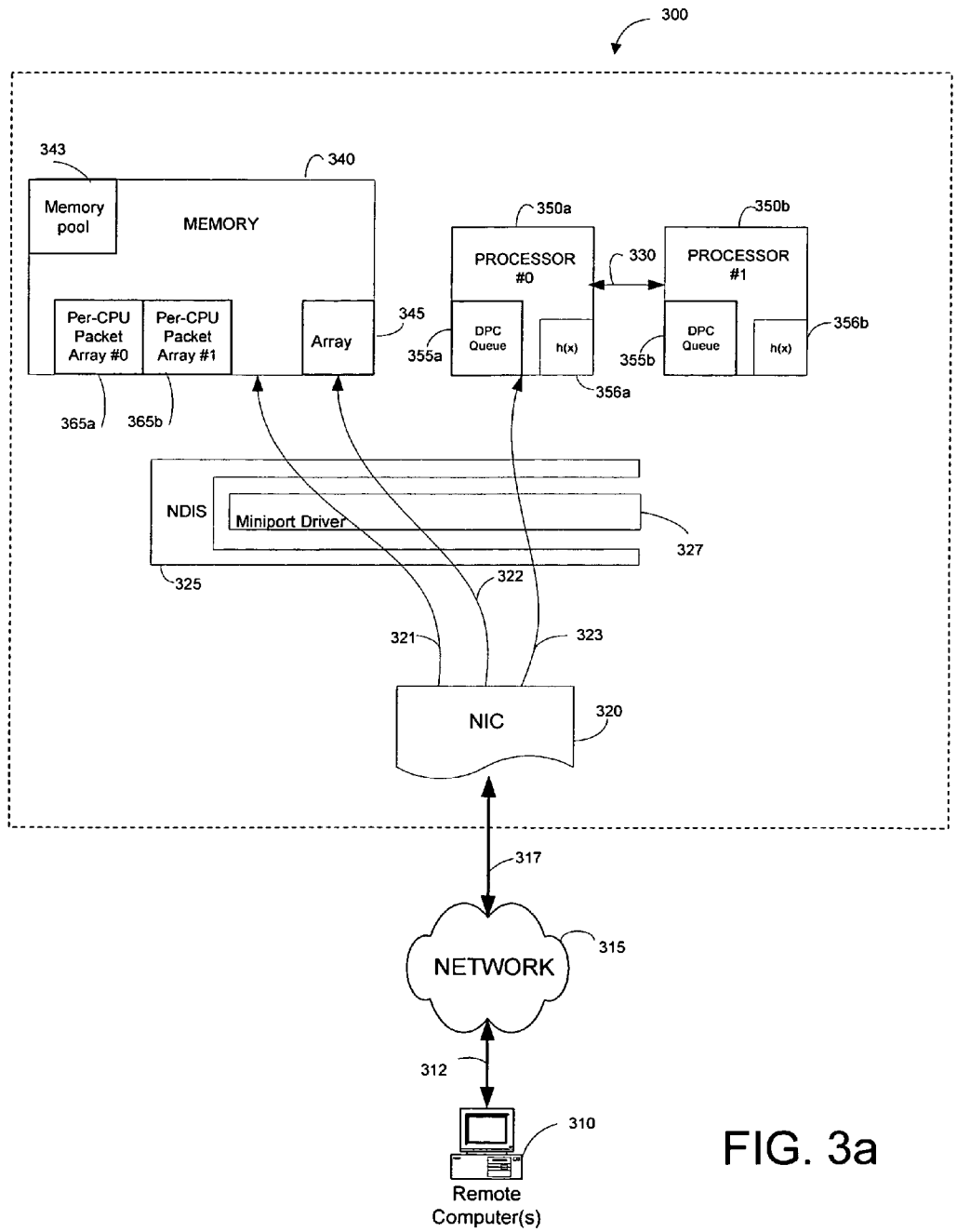
FIGS. 3a, 3b, 3c and 3d are schematic diagrams of general purpose multiprocessor systems in which aspects of the present invention and/or portions thereof may be incorporated.
Figure 3B:
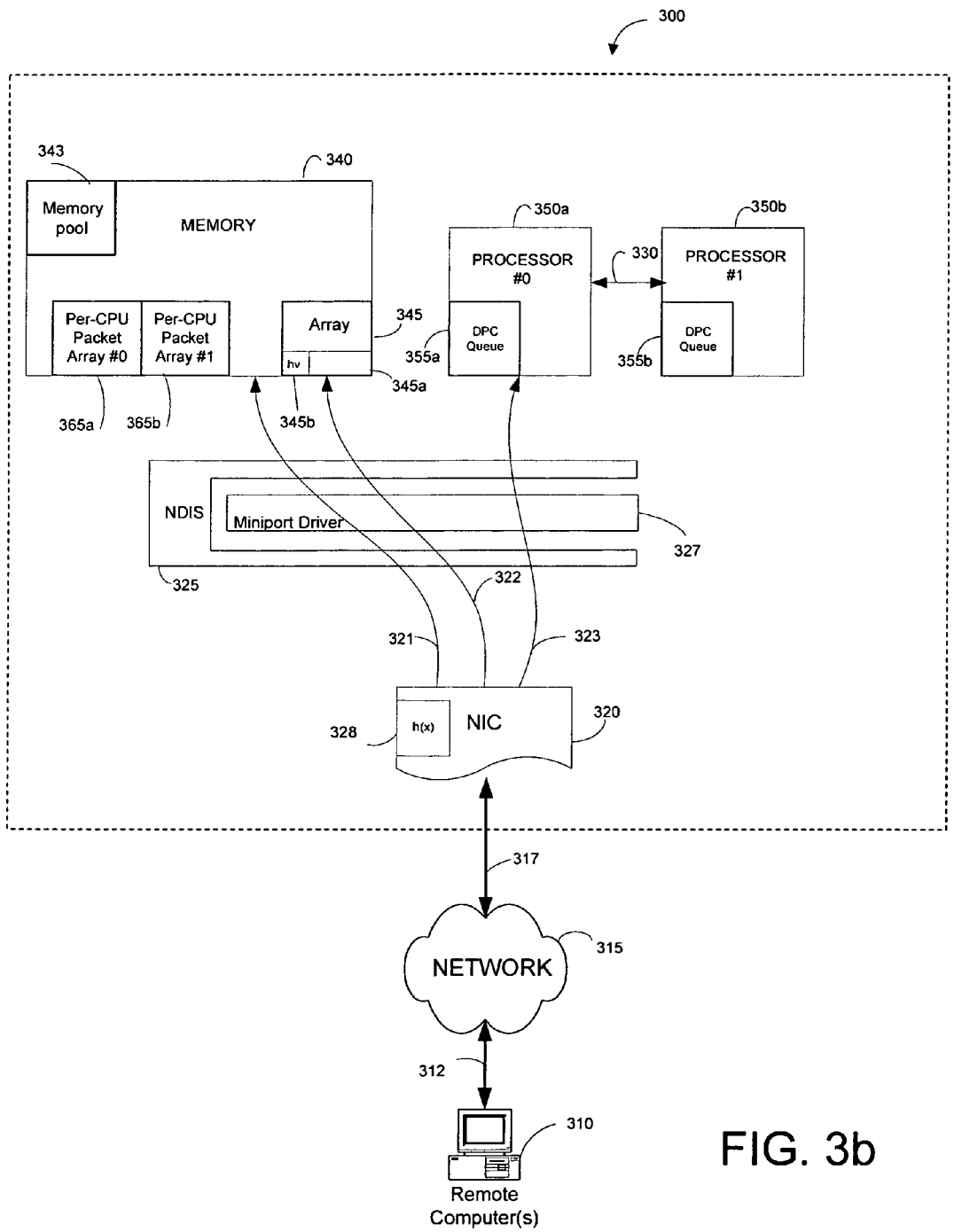

Having described an exemplary computing environment for executing a method for scheduling receive-side processing in a multiprocessor system embodying the present invention, attention is directed to FIGS. 3a-d that depict exemplary networked multiprocessor environments within which the present invention is practiced. Though only two processors are shown, it will be understood by those skilled in the art that the number processors, associated memory structures, and associated data links may be scaled to any number practicable. As depicted in FIG. 3a, a multiprocessor system 300 includes a network interface card (NIC) 320 connected via data links 312, 317 and network 315 to remote computer(s) 310. The NIC 320 connected to main memory 340 via data link 321, to a memory array 345 via data link 322, and to processor 350a via data link 323. Communication between the NIC 320 and the main memory 340 and processor 350a is facilitated by an operating system (not shown). An example of an operating system is the MICROSOFT WINDOWS operating system, also referred to as "Windows NT," "Windows 2000" or "Windows XP." To enable communication with the input/output devices, the operating system utilizes NDIS ("Network Driver Interface Specification") 325, a device driver interface. As is known in the art, NDIS 325 includes a miniport driver 327, a software module that manages the NIC 320 hardware interface including such operations as initializing the NIC 320, allocating memory and sending and receiving data through the NIC 320.

As is known in the art, communication between the remote computer(s) 310 and the multiprocessor system 300 requires the use of a communications protocol. In an embodiment of the present invention, connections are established through the use of TCP ("Transmission Control Protocol), a communications protocol that enables two networked computers to establish a connection and exchange streams of data. Various communications protocols are employed in alternative embodiments of the invention such as IPX/SPX, NetBEUI and AppleTalk. With continued reference to FIG. 3a, packets of data are sent through the network 315 and received by the NIC 320. As is known in the art, the data stream may entail the transmission of numerous data packets received by the NIC 320 at different intervals. The data packet contains information relating to the data stream such as the source port number, destination port number and specific data request.

As will be explained further herein below, when a first packet of data is received by the NIC 320 from the network 315, the data packet is stored in a pre-allocated pool of memory 343 located in the main memory 340 of the multiprocessor system 300. Direct memory access (DMA), a method by which memory access is accomplished without the use of a processor, is used by the NIC 320 to store the data packet in memory 343. At the same time or shortly after the data packet is stored in the memory pool 343, a data packet descriptor, including pointer information identifying the location of the data packet in memory pool 343, is stored in a memory array 345. After the data packet and data packet descriptor are stored in memory 340, an interrupt request (IRQ) is sent from the NIC 320 to a "scheduling processor," one of the processors 350a, 350b in the multiprocessor system 300 chosen through the use of a load-balancing algorithm for the purpose of handling original requests. Ideally, the scheduling processor chosen by the load-balancing algorithm is the least busy processor in the multiprocessor system 300. Alternatively, the interrupt request rotates between the available processors on a round-robin basis or the NIC 320 could be affinitized to a certain processor in the system such that all interrupt requests from a certain network connection routinely proceed to the same processor. In the example of FIG. 3a, the load-balancing algorithm determines that processor 350a will be the scheduling processor.

As is known in the art, interrupt servicing can typically consist of either two driver-provided components, an "interrupt service routine" (ISR) and a "deferred procedure call" (DPC), or a model that combines the two. By way of example and not limitation, the two-component model is assumed in the proceeding description of embodiments of the invention. Both the ISR and DPC use costly processor cycles that degrade performance of the system if not used economically. ISRs and DPCs are well known in the art and need not be discussed at length here. After the interrupt is generated by the NIC 320, the ISR disables generation of further interrupts by the NIC 320. Thereafter, ISR requests a DPC to execute scheduling of the data packet by placing a DPC object in the DPC queue 355a of the scheduling processor 350a. For purposes of illustration, the DPC queue is shown logically with the processor, however those skilled in the art will recognize the DPC queue may be implemented in physical memory. While the DPC object is removed from the DPC queue 355a, additional data packets associated with the data stream and other data streams are received by the NIC 320 from the network 315. All additional data packets are also stored in the memory pool 343 via the use of DMA and associated packet descriptors are stored in the memory array 345. No interrupts, however, are generated because the DPC is still running on scheduling processor 350a and interrupts from the NIC have been disabled. Only after the DPC runs to completion on processor 350a are interrupts on the NIC 320 re-enabled.

As the DPC runs on processor 350a, both the packet descriptors from memory array 345 and the data packet from the memory pool 343 are read. Processor 350a, by way of the miniport driver 327, then runs a secure mapping algorithm to determine which processor in the multiprocessor system 300 will process the data packet. The secure mapping algorithm is any acceptable algorithm, such as a secure hashing function, adopted by the system that ensures data packets received from the same network connection are routinely scheduled for processing by the same selected processor in the multiprocessor system, such that the mapping is cryptographically secure. In this embodiment, the secure hashing function 356a uses any part of the communication header or data packet descriptor, alone or in combination, as a method for determining a hash value. The hash value, in conjunction with a processor selection policy, identifies which processor 350a or 350b (as shown in FIG. 3a) in the multiprocessor system 300 is assigned the task of processing the data packet. Because each processor 350a, 350b in the multiprocessor system 300 uses the identical secure hashing function 356a, 356b, data packets associated with the same network connection are destined to be processed on the same selected processor given that the header information, upon which the secure hashing function operates, produces an identical hash value. This method of systematically partitioning data streams for connections across processors enables a connection state to live on a single processor for the lifetime of the connection which, in turn, enhances performance of the multiprocessor system.

After determining the selected processor, the scheduling processor 350a builds a per-CPU packet using the information in the data packet and data packet descriptor. The per-CPU packet is then queued up on the selected processor by way of placing the per-CPU packet in the selected processor's per-CPU packet array. In the example of FIG. 3a, each of the processors 350a, 350b has a DPC queue 355a, 355b. In FIG. 3a, scheduling processor 350a schedules a DPC on processor 350b by placing the DPC in DPC queue 355b through data link 330. As the DPC runs on the scheduling processor, all the packet descriptors and data packets are read respectively from the memory array 345 and the memory pool 343. As described above, the data is used to build per-CPU packets that are queued individually to the selected per-CPU packet array 365a, 365b as determined by the secure hashing function. Upon completion of queuing the per-CPU packets, the scheduling processor requests a DPC for each of the other processors in the system that have a non-empty per-CPU packet array 365a, 365b. Thereafter, the scheduling processor processes any per-CPU packets that were queued for processing to the scheduling processor. This is intended to assist in interrupt moderation. With reference to FIG. 3a, processor 350a processes all per-CPU packets in the per-CPU packet array 365a while a DPC on processor 350b processes per-CPU packets on per-CPU packet array 365b if the per-CPU packet array 365b is non-empty.

As will be explained further herein below, the process of applying the secure hashing function to the data packets to determine a hash value is performed at different steps in the method and by different framework components according to the various embodiments of the invention. In an alternative embodiment depicted in FIG. 3b, the NIC 320 includes a secure hashing function 328 that is applied to the protocol headers of the data packet yielding a hash value. The hash value 345b is stored in the memory array 345 as part of the packet descriptor 345a. This embodiment of the invention enhances performance by enabling the scheduling processor running the DPC to build the per-CPU packet by reading only the packet descriptor 345a that includes the hash value 345b and not the actual data packet, as well as not requiring the scheduling processor to calculate the CPU intensive cryptographic hash value. As with the previous embodiment, the scheduling processor queues those packets individually to the selected per-CPU packet array 365a, 365b as determined by the secure hashing value.

Figure 3C:
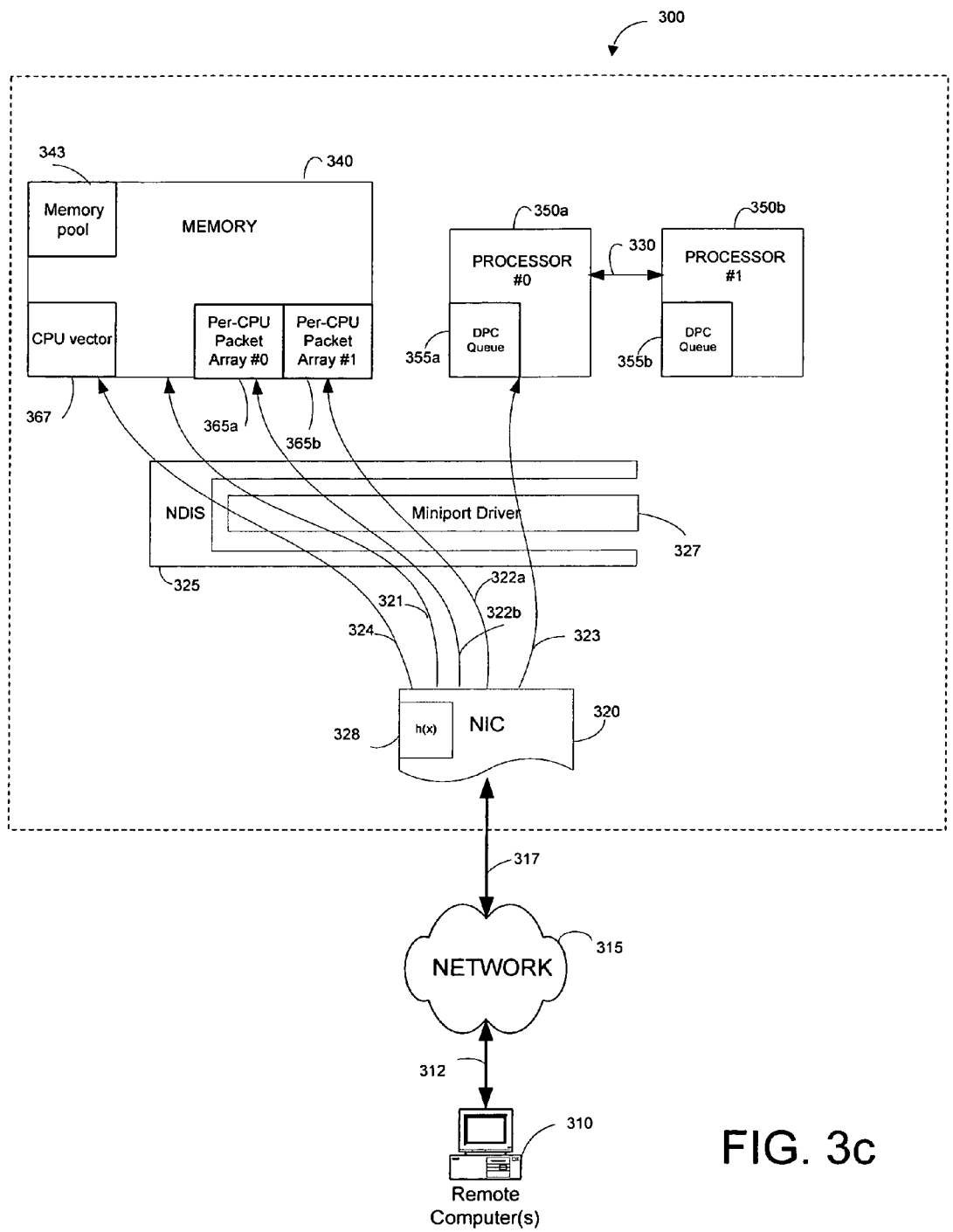

In another embodiment of the present invention depicted in FIG. 3c, the NIC 320 maintains the per-CPU packet arrays 365a, 365b via data links 322a and 322b, respectively, for each processor in the multiprocessor system 300. After applying the secure hashing function 328 to the data packet to determine the hash value, the NIC 320 populates the appropriate per-CPU packet array 365a, 365b with per-CPU packets including the hash value in a packet descriptor. The NIC 320 also maintains a CPU vector 367 in memory 340, via DMA, to track which CPUs should have a DPC scheduled to process newly arrived packet descriptors queued in the per-CPU packet arrays 365a, 365b. After hashing of the data packets is complete, the NIC generates an interrupt. The ISR reads the CPU vector 367 and uses this information to issue a DPC request to each selected processor for which the associated per-CPU packet array 365a,365b is non-empty. This embodiment further enhances performance of the system by providing selected processors with necessary information by way of the receive queue, skipping the steps of writing and reading the packet descriptors to and from memory and reducing the number of cache misses due to not having to process packet descriptors on array 345.

Figure 3D:
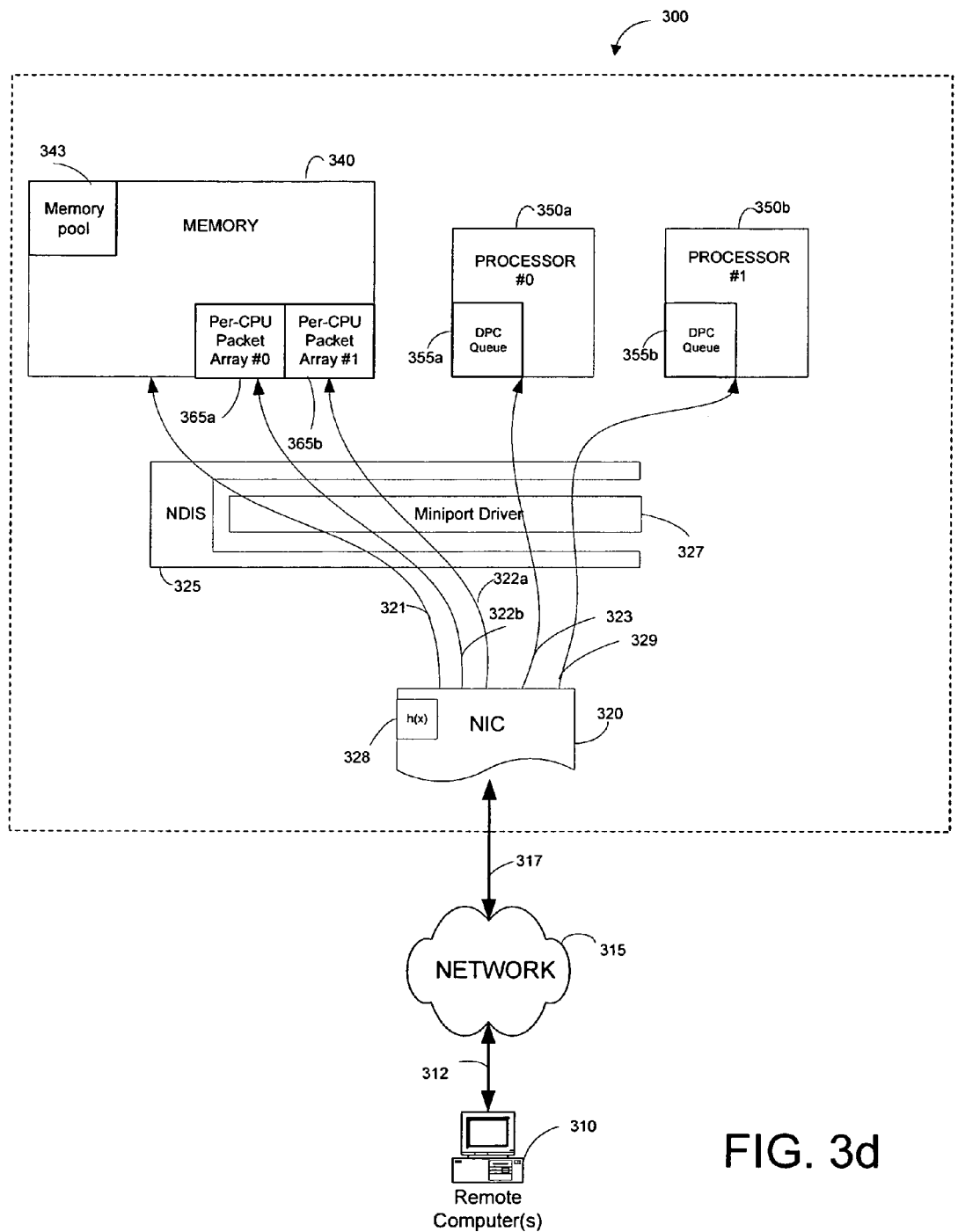

In yet another embodiment of the present invention depicted in FIG. 3d, the NIC 320 again maintains the per-CPU packet arrays 365a, 365b via data links 322a and 322b, respectively, and fires an interrupt to each processor 350a, 350b individually. In this embodiment, there is no need for a scheduling processor. Data links 323 and 329 allows NIC 320 to issue a interrupt directly to the processor(s) which received incoming data. FIG. 3d shows both processor 350a and processor 350b receiving an interrupt through data link 323 and 329, respectively. Those skilled in the art will understand this model for interrupting the CPU can be done by a variety of technologies, including the Peripheral Interrconnect Bus (PCI) version called MSI-X. This allows each ISR to issue a DPC directly to its local DPC queue, 355a and 355b, given that the per-CPU packet arrays 365a or 365b for processor 350a or 350b, respectively, is non-empty. When each DPC is finished, it may re-enable interrupts, thus providing more parallelism by not forcing a processor to wait on DPCs running on other processors before re-enabling interrupts. Alternatively, interrupts may be re-enabled only after all DPCs have completed running, or some combination thereof.

Figure 4:
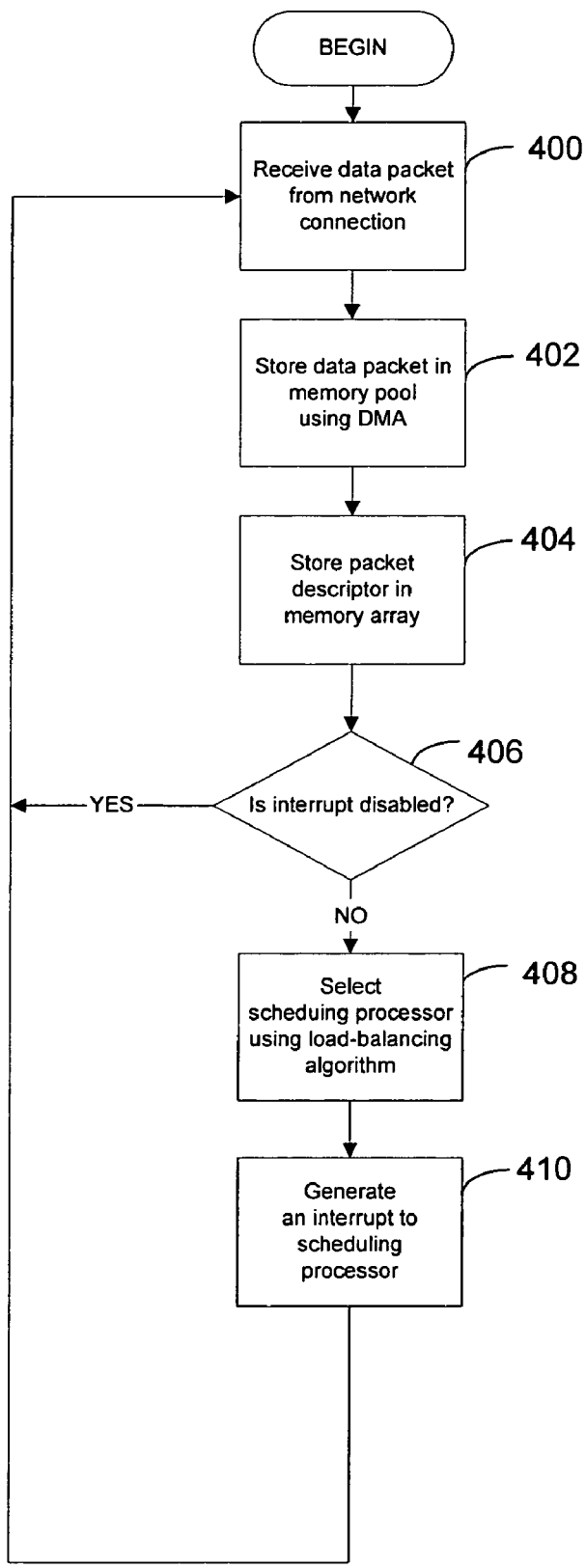
FIG. 4 is a flowchart depicting steps performed by a network interface card scheduling receive-side processing.

Having described the structures that support an exemplary receive-side DPC processing technique embodying the present invention, attention is now directed to FIG. 4 that depicts a set of steps performed by the network interface card to securely schedule receive-side processing of data packets in the multiprocessor system. The steps described herein below are exemplary. As those skilled in the art will readily appreciate, the present invention can be carried out in a variety of manners and the steps described herein below can be rearranged and modified in accordance with alternative embodiments of the present invention.

The procedure begins at step 400 where the NIC 320 receives a data packet from a remote computer 310. The data packet includes data such as a source port address, a destination port address and other data related specifically to the request. At step 402, the data packet is stored using DMA in the pre-allocated memory pool 343 depicted in FIG. 3a. At step 404, a packet descriptor is stored in the memory array 345. Thereafter, at step 406, a determination is made whether to generate an interrupt. If the interrupt is disabled, the method returns to step 400 to receive additional data packets and begin the process of storing them. If the interrupt is not disabled, at step 408 a load-balancing algorithm selects a scheduling processor to handle the original requests, if a scheduling processor is used. The load-balancing algorithm is any acceptable load-balancing algorithm adopted by the network interface card. In one embodiment of the invention, the scheduling processor selected is the least busy processor in the multiprocessor system 300. In another embodiment of the invention, the scheduling processor rotates between the available processors on a round-robin basis. After the scheduling processor is selected, at step 410 an interrupt is generated by the NIC 320 to the scheduling processor. Thereafter, the procedure returns to step 400 where the NIC 320 continues to receive data packets from the network 315. In an alternate embodiment of the invention, a scheduling processor is not used, and the NIC 320 has the ability to interrupt CPUs individually. In this case step 408 consists of selecting the CPUs which have packets in their per-CPU packet array, and step 410 consists of interrupting all of the CPUs directly.

Figure 5:
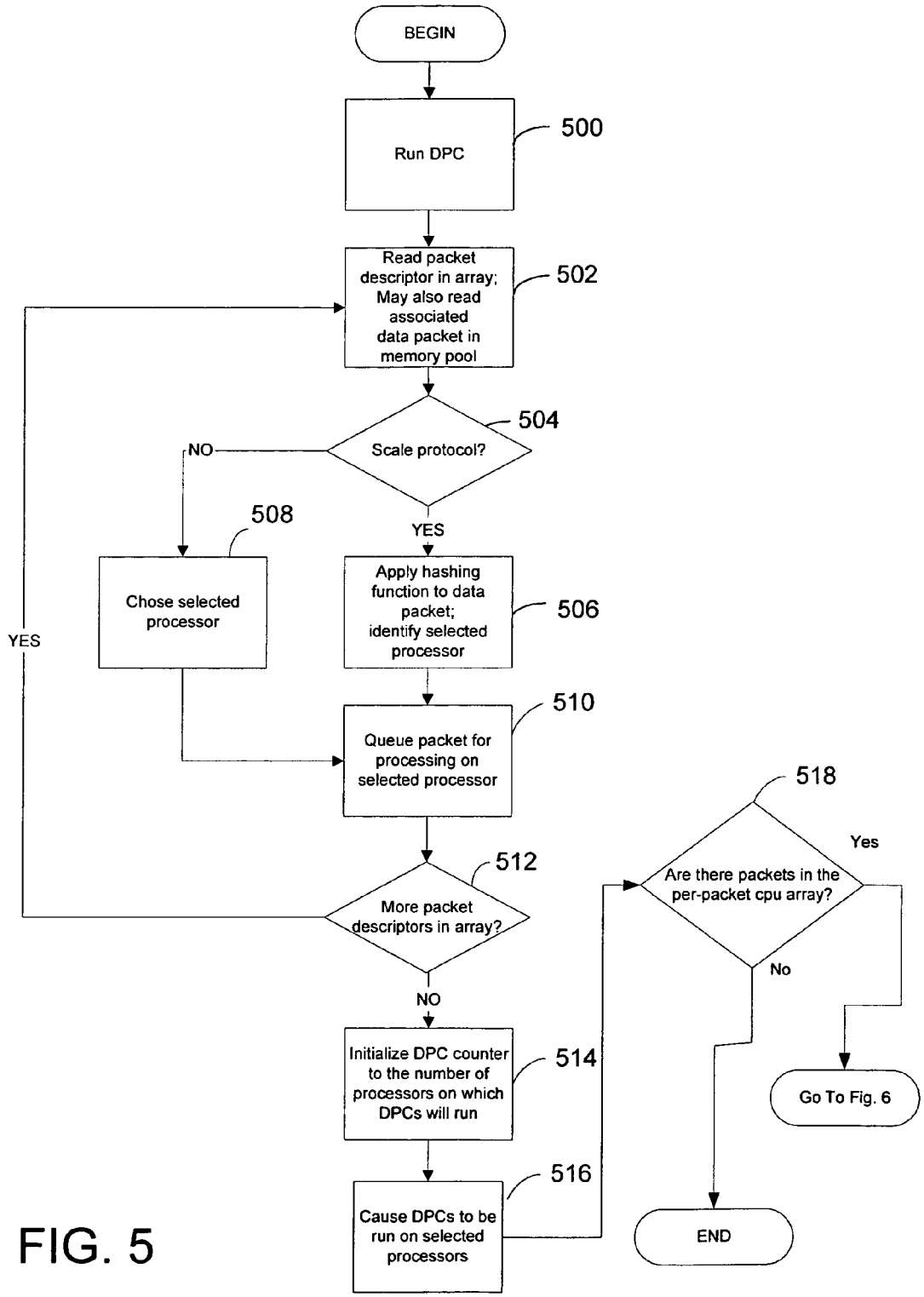
FIG. 5 are flowcharts depicting steps performed by a scheduling processor managing receive-side processing.

Attention is now directed to FIG. 5 that depicts a set of steps performed by the scheduling processor after the NIC 320 requests an ISR which requests a DPC on the scheduling processor. The steps described herein below are exemplary. The procedure begins at step 500 in FIG. 5 wherein the scheduling processor runs the requested DPC. At step 502, the scheduling processor reads both the packet descriptor from the memory array 345, and may also read the data packet from the memory pool 343. In step 504, the procedure determines whether the data packet is of the type that should be scaled across the processors 350a, 350b. If the data packet should be scaled, in step 506, a secure hashing function is applied to the protocol headers of the data packet yielding a hash value. With the use of a processor selection policy, the hash value identifies a selected processor in the system. An exemplary processor selection policy includes any acceptable manner of cross-referencing the hash value to a processor in the multiprocessor system, including a processor identification table.

If the data packet is not of the type that should be scaled, in step 508, the selected processor is chosen based on other load-balancing criteria. Next, in step 510, the procedure queues up a packet descriptor for the data packet in the per-CPU packet array of the selected processor previously identified in either step 506 or 508. Thereafter, in step 512, the procedure determines whether any additional packet descriptors remain in the memory array 345. If yes, the procedure returns to step 502 where the process of reading the packet descriptor and data packet continues.

If no additional packet descriptors are in the memory array 345 or the number of packets processed in this DPC has reached some threshold, the procedure continues to step 514 where the scheduling processor initializes a counter to N, where N is the number of processors upon which a DPC will be scheduled (i.e. the number of CPUs whose corresponding per-CPU packet array is non-empty). At step 516, the scheduling processor causes DPCs to be run on the selected processors. If it is determined that there are no packets in the per-CPU packet array of the scheduling processor, the procedure ends. Otherwise, each processor runs the scheduled DPC as illustrated in FIG. 6.

Figure 6:
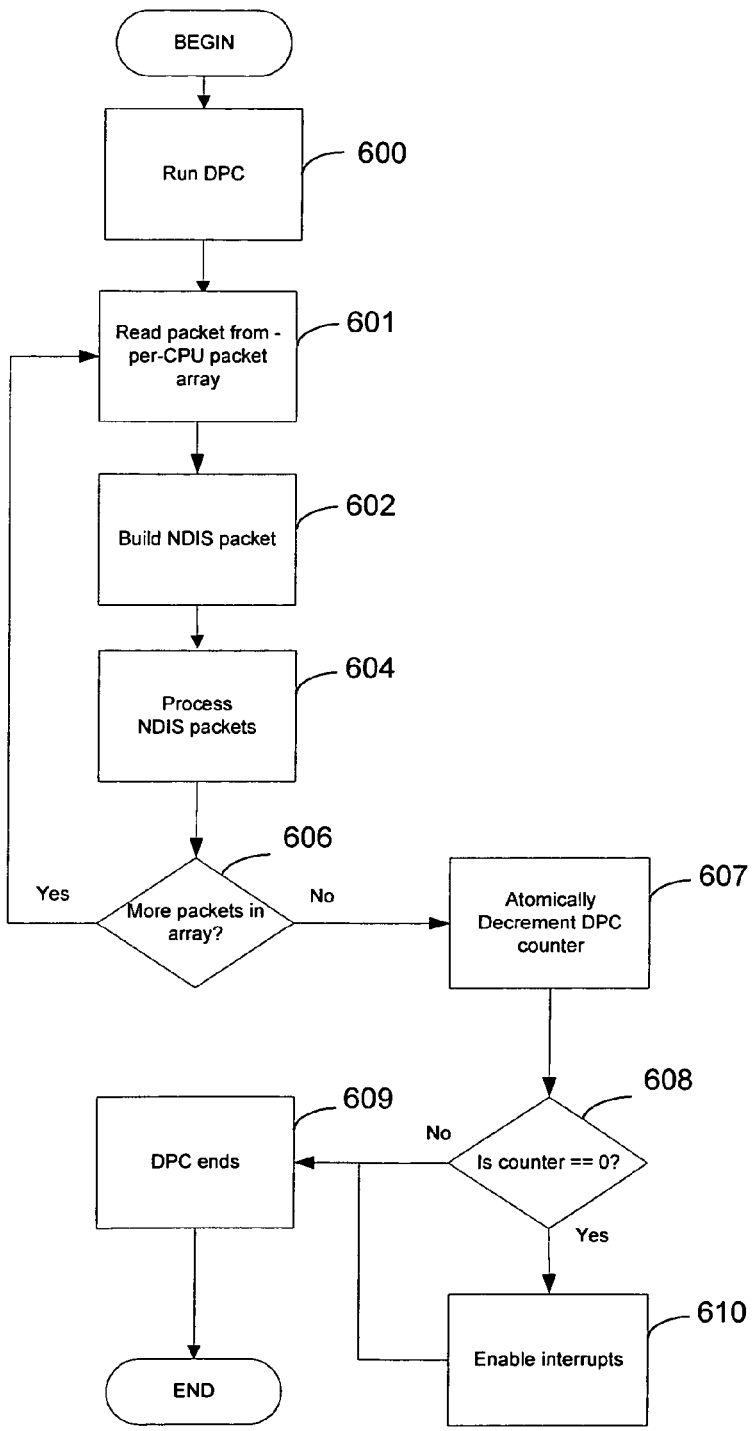
FIG. 6 is a flowchart depicting steps performed by a selected processor in a multiprocessor system performing receive-side processing.

Attention is now directed to FIG. 6 that depicts a set of steps performed by each of the selected processors having the DPC request. The steps described herein below are exemplary. The procedure begins at step 600 in FIG. 6, wherein the procedure runs the DPC at the selected processor. Next, at step 601, the procedure reads a packet from its per-CPU packet array, and builds an NDIS packet at step 602. At step 604, the NDIS packet is processed by the selected processor. If it is determined at step 606 that there are more packets in the per-CPU packet array, the procedure returns to step 601. Those skilled in the art will recognize that the processing loop just described can be rearranged in order with the same effect. For example, the actual processing of the NDIS packets could occur outside of the loop instead of inside of the loop, or the actual processing of the packet could not even occur within the DPC and happen at some later time. Regardless, after the packets in the array have been processed, the counter initialized in step 514 is atomically decremented at step 607. If it is determined that the counter is at zero at step 608, interrupts are enabled at step 610, and the DPC ends at step 609. If the counter is nonzero, the DPC is not the last DPC to end, so the DPC ends without re-enabling interrupts. However, as noted with respect to FIG. 3d, if individual interrupts are used instead of a scheduling processor, each processor may re-enable its interrupt at the end of the DPC regardless of whether other processors are still running a DPC.

Figure 7:
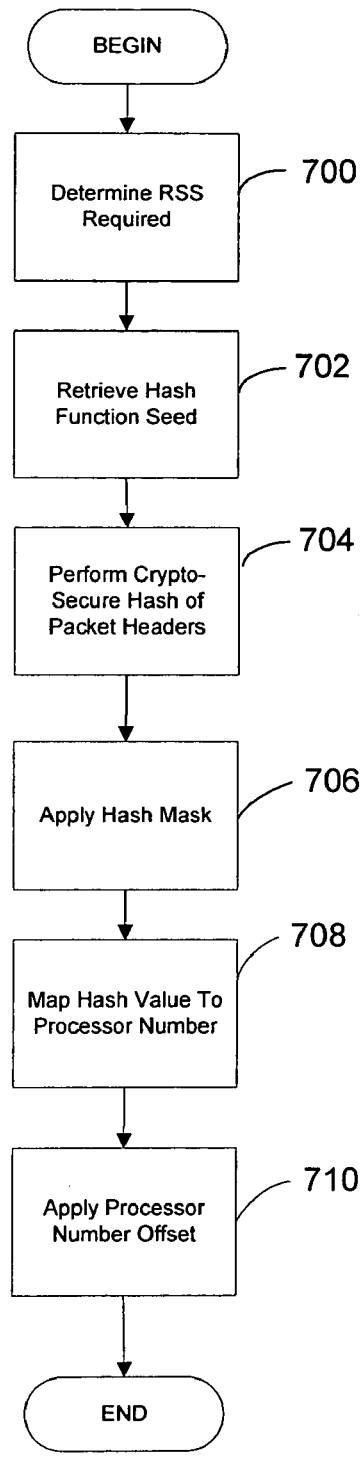
FIG. 7 is a flowchart depicting steps performing a cryptographically secure hash to resolve a processor for a received packet.

Attention is now directed to FIG. 7 that depicts a set of steps performed by the scheduling processor to apply a cryptographically secure hash to an incoming data packet, and using the generated hash value to assign the packet to a processor. At step 700, the scheduling processor determines that a received packet is to be scaled. The scheduling processor retrieves a random key to seed a cryptographically secure hash function at step 702. The hash seed needs to be the same to ensure that all packets for a specific connection, for example, will hash to the same CPU. However, an important aspect of this invention is that if the host system determines that an attacker has cracked the hash and is successfully putting all packets into the same hash bucket, the hash seed can simply be modified, and the attacker must start its attack over. A cryptographically secure hash function is chosen such that it is computationally infeasible to find two inputs that hash to the same value, and, given a particular hash value, it is computationally infeasible to find an input that produces that same hash value. At step 704, the cryptographically secure hash function is seeded with the random key, and the cryptographically secure hash function is applied to at least a portion of the protocol headers of the received packet, producing a hash value. In one embodiment of the invention, the cryptographically secure hash function produces a 32 bit hash value. Thus, at step 706 a hash mask is applied to the hash value produced in step 704. One skilled in the art will understand that the size of the hash mask depend upon the number of processors to which the packet could be directed.

With the use of a processor selection policy, the hash value identifies a selected processor in the system at step 708. An exemplary processor selection policy includes any acceptable manner of cross-referencing the hash value to a processor in the multiprocessor system, including a processor identification table. The processor identification table is used to map the masked hash value to a processor. In an alternative embodiment of the invention, the scheduling processor further bounds the number of CPUs to which hash values can be mapped. Thus, at step 710 a CPU number offset is applied to the CPU number produced by the processor identification table in step 708. In one embodiment of the invention, the CPU number offset is a function that is applied to the CPU number to limit which CPUs are used for received packet processing. The function yields a one-to-one mapping between the CPU number produced by the processor identification table and the set of processors that specified to receive incoming packets. By way of example and not limitation, the CPU number offset may be an increment function implemented by an adder, thereby effectively limiting the base and bounds of the number of CPUs that are used for received packet processing.

Figure 8:
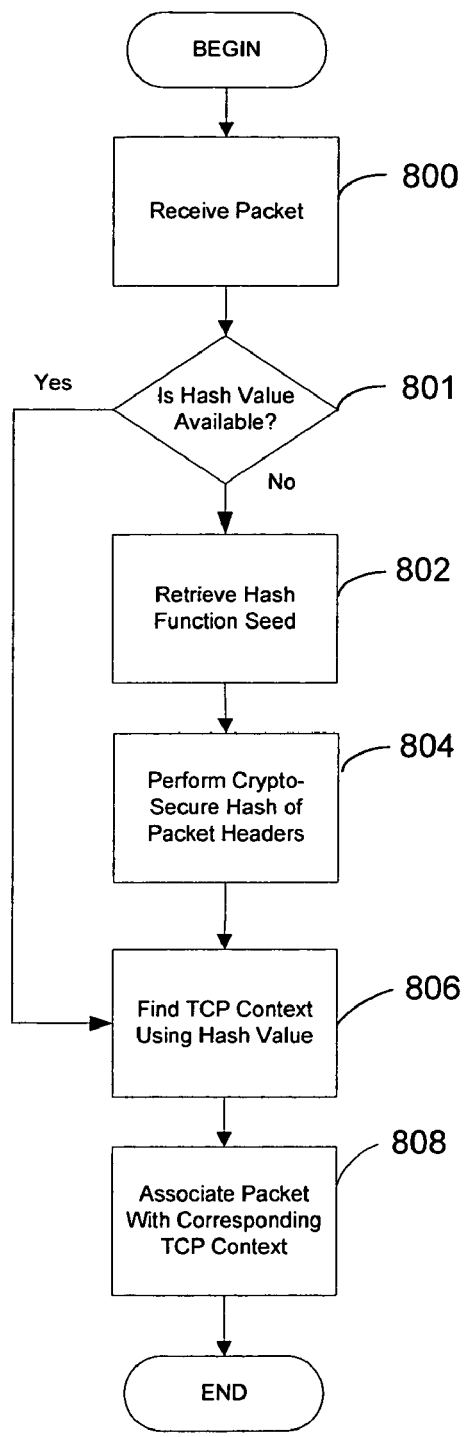
FIG. 8 is a flowchart depicting steps for using a data packet hash value to perform TCP context lookup.

In another embodiment of the invention, the hash value of the packet is made available to the rest of the computer. Attention is now directed to FIG. 8, which depicts steps for TCP context look-up using the hash value. At step 800, a data packet is received from a remote computer. At step 801, it is determined whether a hash value is already available for the packet, presumably because either the scheduling processor or the NIC calculated the value. If so, the method proceeds to step 806, but otherwise the cryptographically secure hash function seed is retrieved at step 802. At step 804, the cryptographically secure hash function is seeded with the random key, and the cryptographically secure hash function is applied to at least a portion of the protocol headers of the received packet, producing a hash value. The hash value or a portion of the hash value obtained is compared to a TCP context map table, which maps data packet hash values to open TCP contexts, at step 806. In one embodiment of the invention, the TCP context table map may be partitioned among multiple processors. Accordingly, a first portion of the hash value is used to identify a partition corresponding to one of the processors, and a second portion of the hash value is to lookup the TCP context within the identified partition. At step 808, the received data packet is associated with a corresponding TCP context.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for scheduling receive-side processing of data packets in a multiprocessor computer system comprising a network interface communicably coupled to a network to receive data packets, memory and a plurality of local processors, the method comprising the steps of:

with the network interface:
    receiving a plurality of data packets from one or more remote requesting clients over the network;
    applying a cryptographically secure hashing function to each of the plurality of data packets, the cryptographically secure hashing function producing a hash value for each of the data packets;
    applying each hash value to a processor selection policy to identify a processor number;
    applying each processor number to a processor offset function to select a processor to perform receive-side processing of the corresponding data packet, the processor offset function bounding processor selection to a subset of the plurality of local processors;
    queuing each data packet in a packet array corresponding to the processor selected to perform receiver-side processing for the data packet;
    for each processor having a non-empty packet array, checking a status of an interrupt channel for said processor, wherein each processor has an independent interrupt channel;
    for each interrupt channel that is not disabled, issuing an interrupt to the respective processor requesting processing of the processor's packet array; and
with each processor in the subset of the plurality of local processors:

monitoring an interrupt channel for an interrupt from the network interface;

when the interrupt is received on the interrupt channel, changing the status of the interrupt channel to disabled;

processing all data packets in the processor's packet array; and when all the packets in the processor's packet array have been processed, changing the status of the interrupt channel to not disabled.

2. The method of claim 1, wherein applying the hash value to the processor selection policy comprises utilizing a map table to cross-reference each hash value to the respective processor number.

3. The method of claim 1, wherein a TCP connection is established with the one or more remote requesting clients.

4. The method of claim 1, further comprising applying a hash mask to each hash value before applying the hash value to the processor selection policy.

5. A computer-readable memory device having computer-executable instructions for facilitating scheduling receive-side processing of data packets in a multiprocessor computer system comprising a network interface communicably coupled to a network to receive data packets, memory and a plurality of local processors, the computer-readable medium having computer-executable instructions facilitating performing the steps of:

receiving first and second data packets from one or more remote requesting clients over the network;

applying a cryptographically secure hashing function to the first and second data packets, the cryptographically secure hashing function producing first and second hash values for the first and second data packets, respectively;

applying the first and second hash values to a processor selection policy, the processor selection policy identifying first and second processor numbers corresponding to the first, and second data packets, respectively;

applying the first and second processor numbers to a processor offset function that bounds processor selection to a subset of the plurality of local processors, wherein the processor offset function identifies a first processor to perform receive-side processing of the first data packet and identifies a second processor to perform receiver-side processing of the second data packet;

providing the first and second data packets to first and second packet arrays, respectively;

checking a status of a first interrupt channel for the first processor;

checking a status of a second interrupt channel for the second processor, the status of the second interrupt channel being independent of the status of the first interrupt channel;

sending a first interrupt directly to the first processor when the first interrupt channel is not disabled and the first packet is in the first packet array, the first interrupt requesting processing of all packets, including the first packet, in the first packet array; and sending a second interrupt directly to the second processor when the second interrupt channel is not disabled and the second packet is in the second packet array, the second interrupt requesting processing of all packets, including the second packet, in the second packet array.

6. The computer-readable storage medium of claim 5, wherein the receiving step comprises receiving, by the network interface, the data packet from the network and storing the data packet and a data packet descriptor in memory.

7. The computer-readable storage medium of claim 6, wherein applying a cryptographically secure hashing function comprises reading, by a scheduling processor, the data packet descriptor and the data packet from memory and applying the cryptographically secure hashing function to the data packet yielding the hash value.

8. The computer-readable storage medium of claim 5, wherein applying the first and second hash values to a processor selection policy comprises utilizing a map table to cross-reference the first and second hash value to the first and second processor number, respectively.

9. The computer-readable storage medium of claim 5, further comprising a step of establishing Transmission Control Protocol (TCP) connection with the one or more remote requesting clients.

10. The computer-readable storage medium of claim 5, further comprising applying a hash mask to the first and second hash values before applying the first and second hash value to the processor selection policy.

11. The computer-readable storage medium of claim 5, wherein the steps are performed by the network interface of the multiprocessor computer system.

12. A method for packet context lookup in a multiprocessor computer system comprising a network interface communicably coupled to a network to receive data streams, memory and at least two local processors, the method comprising the steps of:

receiving first and second data packets from one or more remote requesting clients over the network connection;

applying a cryptographically secure hashing function to the first and second data packets, the cryptographically secure hashing function producing a first and second hash value for the first and second data packets, respectively;

identifying one or more processors to perform receiver-side processing of the first and second data packets based on the first and second hash values, respectively, wherein a first processor is identified to process the first packet and a second processor is identified to process the second packet;

sending a first interrupt to the first processor when a status of a first interrupt channel for the first processor is not disabled, the first interrupt requesting processing of the first packet;

sending a second interrupt to the second processor when a status of a second interrupt channel for the second processor is not disabled, the second interrupt requesting processing of the first packet, wherein the status of the first interrupt channel is independent of the status of the second interrupt channel; and finding a packet context associated with the first hash value by utilizing a packet context lookup table mapping a plurality of hash values to a plurality of packet contexts.

13. The method of claim 12, further comprising establishing a Transmission Control Protocol (TCP) connection between the one or more remote requesting clients and the multiprocessor system, wherein the packet context is a TCP packet context.

14. The method of claim 12, wherein the packet context lookup table is partitioned among the at least two local processors, and a first portion of the hash value is used to identify a partition corresponding to one of the at least two local processors, and a second portion of the hash value is to lookup the packet context within the identified partition.

* * * * *